(12) United States Patent
Liu (10) Patent No.: US 9,160,616 B2
(45) Date of Patent: Oct. 13, 2015

(54) MULTICAST PACKET TRANSMISSION METHOD, RELATED DEVICE AND SYSTEM

(71) Applicant: Huawei Technologies Co., Ltd., Shenzhen, Guangdong (CN)

(72) Inventor: Hui Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/622,742

(22) Filed: Sep. 19, 2012

(65) Prior Publication Data
US 2013/0088951 A1 Apr. 11, 2013

(30) Foreign Application Priority Data
Sep. 19, 2011 (CN) .......................... 2011 1 0278178

(51) Int. Cl.
| | |
|---|---|
| *H04L 12/707* | (2013.01) |
| *H04L 12/24* | (2006.01) |
| *H04L 12/18* | (2006.01) |
| *H04L 12/703* | (2013.01) |
| *H04L 12/761* | (2013.01) |
| *H04W 4/06* | (2009.01) |

(52) U.S. Cl.
CPC ........ *H04L 41/0654* (2013.01); *H04L 12/1886* (2013.01); *H04L 41/0663* (2013.01); *H04L 45/16* (2013.01); *H04L 45/22* (2013.01); *H04L 45/28* (2013.01); *H04W 4/06* (2013.01)

(58) Field of Classification Search
USPC ......... 370/390, 254, 312, 252, 218, 228, 236, 370/241, 244, 255, 216, 225, 392; 709/224, 709/201, 217, 218, 227; 707/E17.108, 709, 707/694; 706/12; 714/4.1
See application file for complete search history.

(56) References Cited

U.S. PATENT DOCUMENTS

| | | | |
|---|---|---|---|
| 7,480,816 B1 * | 1/2009 | Mortazavi et al. ............. | 714/4.1 |
| 7,684,316 B2 * | 3/2010 | Filsfils et al. .................. | 370/222 |

(Continued)

FOREIGN PATENT DOCUMENTS

| | | |
|---|---|---|
| CN | 101035057 A | 9/2007 |
| CN | 101631043 A | 1/2010 |

(Continued)

OTHER PUBLICATIONS

Deering et al., IETF, Protocol Independent Multicast-Sparce Mode (PIM-SM): Motivation and Architecture, IETF, Oct. 24, 1996.*

(Continued)

*Primary Examiner* — Benjamin H Elliott, IV
*Assistant Examiner* — Eric Nowlin
(74) *Attorney, Agent, or Firm* — Leydig, Voit & Mayer, Ltd.

(57) ABSTRACT

Embodiments of the present invention disclose a multicast packet transmission method, and also a related device and system. A multicast packet transmission method may include receiving a first Protocol Independent Multicast (PIM) protocol packet; creating an active multicast topology according to the first PIM protocol packet; receiving a second PIM protocol packet; creating a standby multicast topology according to the second PIM protocol packet, where the second PIM protocol packet carries a standby multicast identifier; setting the standby multicast topology to a disabled state; determining the active multicast topology as faulty; and enabling the standby multicast topology after the active topology is determined as faulty.

12 Claims, 3 Drawing Sheets

The upstream aggregator receives a first PIM protocol packet and creates an active multicast topology  101

▼

The upstream aggregator receives a second PIM protocol packet and creates a standby multicast topology  102

▼

Set the standby multicast topology to a disabled state  103

▼

Determine the active multicast topology as faulty  104

▼

Enable the standby multicast topology  105

(56) References Cited

U.S. PATENT DOCUMENTS

| | | | |
|---|---|---|---|
| 7,953,027 B2* | 5/2011 | Previdi et al. | 370/256 |
| 8,755,266 B2* | 6/2014 | Muley et al. | 370/217 |
| 2006/0018321 A1* | 1/2006 | Yamada et al. | 370/392 |
| 2007/0019646 A1* | 1/2007 | Bryant et al. | 370/390 |
| 2007/0133530 A1* | 6/2007 | Previdi et al. | 370/390 |
| 2008/0095161 A1* | 4/2008 | Xu | 370/390 |
| 2008/0267078 A1* | 10/2008 | Farinacci et al. | 370/244 |
| 2009/0161670 A1* | 6/2009 | Shepherd et al. | 370/389 |
| 2012/0195311 A1* | 8/2012 | Gupta et al. | 370/390 |

FOREIGN PATENT DOCUMENTS

| | | |
|---|---|---|
| CN | 102316016 A | 1/2012 |
| JP | 2006238484 A | 9/2006 |
| JP | 2011124811 A | 6/2011 |
| WO | WO 2011035699 A1 | 3/2011 |

OTHER PUBLICATIONS

Boers et al., IETF, RFC 5384: The Protocol Independent Multicast (PIM) Join Attribute Format, IETF, Nov. 2008.*

Joshi et al., IETF, RFC 5240: Protocol Independent Multicast (PIM) Bootstrap Router MIB, IETF, Jun. 2008.*

Sivaramu et al., IETF, RFC 5060: Protocol Independent Multicast MIB, IETF, Jan. 2008.*

Nortel (Nortel Ethernet Routing Switch: Configuring IP Multicast Routing Protocols, Version 01.03, Nortel, Jan. 15, 2008).*

Cai et al., "PIM Multi-Topology ID (MT-ID) Join-Attribute; draft-ietf-pim-mtid-07.txt," Proposed Standard, Jan. 31, 2011, The Internet Engineering Task Force, Fremont, California.

Cai et al., "PIM Multi-Topology ID (MT-ID) Join-Attribute; draft-ietf-pim-mtid-08.txt," Proposed Standard, Jun. 10, 2011, The Internet Engineering Task Force, Fremont, California.

Karan et al., "Multicast only Fast Re-Route; draft-karan-mofrr-01," Informational Memo, Mar. 13, 2011, The Internet Engineering Task Force, Fremont, California.

Liu et al., "Single Stream Multicast Fast ReRoute (SMFRR) Method, draft-liu-pim-single-stream-multicast-frr-01," Standard Track Memo, Oct. 18, 2010, The Internet Engineering Task Force, Fremont, California.

Fenner et al., "RFC-4601—Protocol Independent Multicast—Sparse Mode (PIM-SM): Protocol Specification (Revised)," Standards Track Memo, Aug. 2006, The Internet Society, Reston, Virginia.

Boers et al., "RFC-5384—The Protocol Independent Multicast (PIM) Join Attribute Format," Standards Track Memo, Nov. 2008, The Internet Engineering Task Force, Fremont, California.

1st Office Action in corresponding Japanese Patent Application No. 2012-205449 (Sep. 10, 2013).

1st Office Action in corresponding Chinese Patent Application No. 201110278178.9 (Mach 25, 2013).

Extended European Search Report in corresponding European Patent Application No. 12184857.6 (Jan. 24, 2013).

* cited by examiner

MULTICAST PACKET TRANSMISSION METHOD, RELATED DEVICE AND SYSTEM

CROSS-REFERENCE TO RELATED APPLICATIONS

This application claims priority to Chinese Patent Application No. 201110278178.9, filed on Sep. 19, 2011, which is incorporated herein by reference in its entirety.

FIELD OF THE INVENTION

The present invention relates to communication field and, in particular, to a multicast packet transmission method, related device and system.

BACKGROUND OF THE INVENTION

The Internet Protocol (IP for short, Internet Protocol) multicast technology implements point-to-multipoint data transmission efficiently. The multicast technology saves bandwidth efficiently, controls network traffic, relieves the load of a server, and reduces network load. Therefore, the multicast technology is applied in real-time transmission of a video service, multimedia conference, game, emulation, and so on.

The modern network service imposes higher and higher requirements on the real-time feature. For example, the services such as voice over Internet Protocol (VoIP for short, Voice over Internet Protocol), online game, and online video are very sensitive to packet loss. In the running process of the IP multicast, if a network is faulty, a unicast routing protocol needs to perform calculation first according to the change of the network topology to implement convergence, and then a multicast routing protocol such as Protocol Independent Multicast (PIM for short, Protocol Independent Multicast) Protocol reselects an inverse path (RPF for short, Reverse Path Forwarding) to forward the packet to an upstream node according to a new unicast route, and sends a request to an upstream router hop by hop, and the transmission of the multicast traffic is not recovered until a new multicast forwarding path is created. Therefore, before the new multicast forwarding path is created successfully, the multicast traffic is not transmitted normally, which leads to service interruption. Persons skilled in the art are exploring how to prevent interruption of multicast traffic transmission when the network is faulty, but no effective technical solution to such a problem has been worked out.

SUMMARY OF THE INVENTION

Embodiments of the present invention provide a multicast packet transmission method, a related device and a system to implement fast switching between the forwarding paths in the case of a fault, and ensure normal operation of the service.

To solve the foregoing technical problem, the embodiments of the present invention provide the following technical solutions:

A multicast packet transmission method includes:
receiving, by an upstream aggregator, a first Protocol Independent Multicast (PIM) protocol packet;
creating an active multicast topology according to the first PIM protocol packet;
receiving a second PIM protocol packet;
creating a standby multicast topology according to the second PIM protocol packet, where the second PIM protocol packet carries a standby multicast identifier;
setting the standby multicast topology to a disabled state;
determining the active multicast topology as faulty; and
enabling the standby multicast topology after the active topology is determined as faulty.

A network node includes:
a receiving unit, configured to receive a first Protocol Independent Multicast (PIM) protocol packet and a second PIM protocol packet, where the second PIM protocol packet carries a standby multicast identifier;
a multicast topology creating unit, configured to create an active multicast topology according to the first PIM protocol packet received by the receiving unit, and create a standby multicast topology according to the second PIM protocol packet received by the receiving unit;
a control unit, configured to set the standby multicast topology to a disabled state;
a determining unit, configured to determine the active multicast topology as faulty; and
a standby topology enabling unit, configured to enable the standby multicast topology after the determining unit determines the active multicast topology as faulty.

In the embodiments of the present invention, multiple multicast topologies are created based on the PIM protocol, and the standby multicast topology is identified by a standby multicast identifier carried in the second PIM protocol packet; the local output interface located in the standby multicast topology is disabled when the active multicast topology is normal so that the multicast packet is not forwarded through the standby multicast topology; when the active multicast topology is faulty, the local output interface located in the standby multicast topology is enabled so that the multicast packet is forwarded through the standby multicast topology. On the one hand, the technical solution of the present invention uses multiple multicast topologies, and therefore, when the active multicast topology is faulty, the multicast packet can be forwarded through the standby multicast topology, which implements fast switching of the forwarding path and ensures normal operation of the service when the network is partially faulty. On the other hand, when the active multicast topology is normal, the multicast packet is forwarded through the active multicast topology only, which avoids excessive occupation of network resources and ensures performance of the multicast system.

BRIEF DESCRIPTION OF THE DRAWINGS

To make the technical solution of the present invention or the prior art more clearly, the following provides the accompanying drawings used in description of the embodiments of the present invention or the prior art. Apparently, the accompanying drawings show certain embodiments of the invention, which are illustrative rather than exhaustive, and persons skilled in the art can derive other drawings from them without creative work.

DETAILED DESCRIPTION OF THE EMBODIMENTS

Embodiments of the present invention provide a multicast packet transmission method, a related device and a system.

To make the objectives, characteristics and merits of the present invention more clearly and more comprehensible, the following describes the technical solutions of the embodiments of the present invention clearly and completely with reference to accompanying drawings. Evidently, the described embodiments are illustrative in nature rather than exhaustive. All other embodiments, which can be derived by persons skilled in the art from the embodiments given herein without creative work, shall fall within the protection scope of the present invention.

Figure 1:
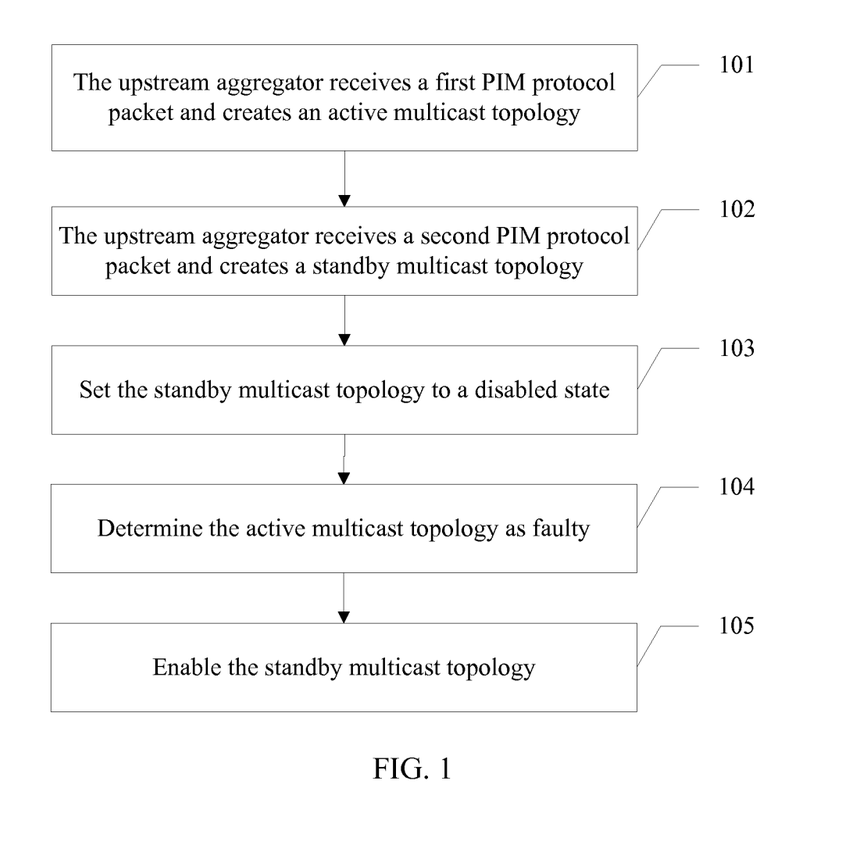
FIG. 1 is a schematic flowchart of a multicast packet transmission method according to an embodiment of the present invention.

The following describes a multicast packet transmission method provided in an embodiment of the present invention. As shown in FIG. 1, the multicast packet transmission method in this embodiment includes the following steps.

101. An upstream aggregator receives a first PIM protocol packet, and creates an active multicast topology according to the first PIM protocol packet.

In this embodiment, the multicast topology is a set of multicast forwarding states of all routers from a root node of a source tree or rendezvous point tree (RPT for short, Rendezvous Point Tree) to a leaf node of the source tree or RPT. In a multicast network, a single multicast topology is created in the following procedure:

Starting from the leaf node of the multicast topology, the downstream node sends a PIM protocol packet to its upstream neighboring node hop by hop, and the upstream neighboring node creates a multicast forwarding path to its downstream node according to the received PIM protocol packet, namely, allocates a unique output interface to its downstream node. Upon receiving the PIM protocol packet sent by the downstream node, the root node of the multicast topology creates a multicast forwarding path to its downstream node according to the received PIM protocol packet, namely, allocates a unique output interface to its downstream node. In this way, the multicast topology is created.

In this embodiment, group address spaces or source address spaces may be configured, different address spaces are mapped onto different multicast topologies, and different address spaces are used to differentiate the multicast forwarding of different multicast topologies, thereby constructing multiple multicast topologies in a multicast network; or, different multicast topologies may share the same address space, and the multicast topology identifier is correlated with the multicast forwarding table entry or multicast forwarding state, thereby constructing multiple multicast topologies in the multicast network. The mode of construction is not limited herein.

In this embodiment, the upstream aggregator may be a root node of a source tree, such as a source designated router (DR for short, Designated Router), or may be a root node of an RPT, such as a rendezvous point (RP for short, Rendezvous Point), and the specific form of the upstream aggregator is not limited herein. Upon receiving the first PIM protocol packet sent by a downstream node, the upstream aggregator creates a multicast forwarding path to the downstream node according to the received first PIM protocol packet, namely, allocates a unique output interface to the downstream node, and finishes creating an active multicast topology.

A Request For Comments 4601 (RFC for short, Request For Comments) document defines two PIM protocol packets: PIM Join packet, and PIM Assert packet. The PIM Join packet creates a multicast forwarding state by transferring from a downstream node to an upstream node hop by hop, and the PIM Assert packet selects a unique upstream node among multiple upstream nodes when multiple upstream nodes exist in a network segment, thereby preventing sending the same multicast packet to the network segment repeatedly. Table 1 and Table 2 show the format of the PIM Join packet and the format of the PIM Assert packet respectively:

TABLE 1

| 1. |
| --- |
| Version    Type    Reserved    Checksum |
| Address of upstream neighboring node (coded unicast address format) |
| Reserved    Number of groups    Retention time |
| Multicast group address 1 (coded group address format) |
| Joining source 1 (coded source address format) |
| ... |
| ... |

TABLE 2

| 2. |
| --- |
| Version    Type    Reserved    Checksum |
| Group address (coded group address format) |
| Source address (coded source address format) |
| R    Metric value priority |
| Metric |

According to the RFC4601 document, the PIM protocol packet is encapsulated in an Internet Protocol (IP, Internet Protocol) packet, and the protocol number is 103. The RFC5384 document extends a format of the coded source address of the PIM protocol packet defined by the RFC4601 document. Table 3 shows the format of the defined coded source address:

TABLE 3

| Address family | Code type | Reserved | S | W | R | Mask length |
| --- | --- | --- | --- | --- | --- | --- |
| Source address | | | | | | |
| F    E    Attribute type | Length | | Value | | | |
| F    E    Attribute type | Length | | Value | | | |
| ...  ...    ... | ... | | ... | | | |

Table 3 defines the packet format of the PIM Join attribute. In this embodiment, the PIM Join attribute may carry multiple multicast topology identifiers to create multiple multicast topologies. For example, the PIM protocol message carries the Join attribute shown in Table 4:

TABLE 4

| 4. |
| --- |
| F    E    Attribute type 1    Length    RRRR    Value |

Attribute type 1 indicates that the currently created multicast topology is one of multiple multicast topologies. In Table 4, "Value" serves to differentiate between multicast topologies, and "R" indicates reserved bits.

102. The upstream aggregator receives a second PIM protocol packet, and creates a standby multicast topology according to the second PIM protocol packet, where the second PIM protocol packet carries a standby multicast identifier.

In this embodiment, the second PIM protocol packet carries a standby multicast identifier. After resolving the received second PIM protocol packet and obtaining the standby multicast identifier, the upstream aggregator can identify the currently created multicast topology as a standby multicast topology.

In this embodiment, the standby multicast identifier may be carried in an extension field of the second PIM protocol packet, or, a value of a flag bit in the second PIM protocol packet may be modified to carry the standby multicast identifier. As shown in Table 3, the coded source address format may carry multiple attribute types. In this embodiment, the PIM Join attribute may carry multiple multicast topology identifiers (as shown in Table 4), and a user-defined attribute type may be defined as a standby multicast identifier. The upstream aggregator can identify the currently connected multicast topology as a standby multicast topology by identifying the user-defined attribute type in the second PIM protocol packet. Table 5 shows a format of the coded source address:

TABLE 5

| Address family | Code type | Reserved | S | W | R | Mask length |
|---|---|---|---|---|---|---|
| Source address | | | | | | |
| F E Attribute type 1 Length | RRRR | | | | | Value |
| F E Attribute type 2 Length | RRRR | | | | | Value |

In the table above, attribute type 1 indicates that the currently created multicast topology is one of multiple multicast topologies, and attribute type 2 is a user-defined attribute type in this embodiment and indicates that the currently created multicast topology is a standby multicast topology. Nevertheless, attribute type 2 may include no R bit, and the coded source address format of the PIM protocol packet may also adopt the format as shown in Table 6:

TABLE 6

| Address family | Code type | Reserved | S | W | R | Mask length |
|---|---|---|---|---|---|---|
| Source address | | | | | | |
| F E Attribute type 1 Length | RRRR | | | | | Value |
| F E Attribute type 2 Length | | Value | | | | |

For example, reserved bits in the PIM protocol packet may be used to carry the standby multicast identifier. For example, any one R bit or a combination of multiple R bits in Table 4 may be used as the standby multicast identifier. Table 7 shows a coded source address format of the first R bit used as the standby multicast identifier:

TABLE 7

| Address family | Code type | Reserved | S | W | R | Mask length |
|---|---|---|---|---|---|---|
| Source address | | | | | | |
| F E Attribute type Length | BRRR | | | | | Value |

The upstream aggregator can identify the currently connected multicast topology as the standby multicast topology according to the reserved bit in the second PIM protocol packet.

Nevertheless, the second PIM protocol message may also carry the standby multicast topology identifier in other modes, and the modes are not limited herein.

103. Set the standby multicast topology to a disabled state.

The upstream aggregator sets the standby multicast topology to the disabled state, and sends the multicast packet through the active multicast topology only.

In this embodiment, the upstream aggregator may set the standby multicast topology to the disabled state in the following way: forbidding duplication of a multicast packet for an output interface which is of the network node and is located on the standby multicast topology; and/or, forbidding the upstream aggregator's output interface located on the standby multicast topology to forward the multicast packet.

104. Determine the active multicast topology as faulty.

In this embodiment, the fault of the multicast topology means that the multicast topology is unable to forward the multicast packet normally. There are many causes for the multicast topology fault. For example, a node in the multicast topology is damaged, which leads to a node fault, or a link between nodes is cut, which leads to a link fault, or network congestion occurs in the network segment of the multicast topology, which leads to a communication fault.

In this embodiment, the upstream aggregator may perform real-time detection for the active multicast topology to check whether the active multicast topology is faulty; or, another device such as a network management device performs real-time detection for the active multicast topology, and, when the active multicast topology is faulty, sends fault notification information indicating the active multicast topology fault to the upstream aggregator, whereupon the upstream aggregator knows whether the active multicast topology is faulty by checking whether the fault notification information is received; or, when a node of the active multicast topology is unable to forward the multicast packet to its downstream node normally, the node sends the fault notification information indicating the active multicast topology fault to the upstream aggregator, whereupon the upstream aggregator knows whether the active multicast topology is faulty by checking whether the fault notification information is received. The specific fault judging mode is not limited herein.

105. Enable the standby multicast topology.

When the active multicast topology is determined as faulty, the upstream aggregator enables the standby multicast topology, and forwards the multicast packet through the standby multicast topology, thereby preventing interruption of the service operation.

In this embodiment, the upstream aggregator may enable the standby multicast topology in the following way: enabling the upstream aggregator to duplicate the multicast packet for the output interface which is of the network node and is located on the standby multicast topology; and/or, enabling the output interface which is of the network node and is located on the standby multicast topology to forward the multicast packet.

Preferably, in this embodiment, when the faulty active multicast topology recovers from the fault, the upstream aggregator determines that the active multicast topology is available, and performs step 103. In this embodiment, the upstream aggregator may perform real-time detection for the faulty active multicast topology to check whether the active multicast topology recovers from the fault; or, another device such as a network management device performs real-time detection for the faulty active multicast topology, and, when the active multicast topology recovers from the fault, sends failover information indicating failover of the active multicast topology to the upstream aggregator, whereupon the upstream aggregator knows whether the active multicast topology recovers from the fault by checking whether the failover information is received; or, after the faulty active multicast topology recovers from the fault, any one node in the active multicast topology sends failover information indicating failover of the active multicast topology to the upstream aggregator, whereupon the upstream aggregator knows whether the active multicast topology recovers from the fault by checking whether the failover information is received. The specific failover judging mode is not limited herein.

In this embodiment, multiple multicast topologies are created based on the PIM protocol, and the standby multicast topology is identified by a standby multicast identifier carried in the second PIM protocol packet; the local output interface located in the standby multicast topology is disabled when the active multicast topology is normal so that the multicast packet is not forwarded through the standby multicast topology; when the active multicast topology is faulty, the local output interface located in the standby multicast topology is enabled so that the multicast packet is forwarded through the standby multicast topology. On one hand, the technical solution of the present invention uses multiple multicast topologies, and therefore, when the active multicast topology is faulty, the multicast packet can be forwarded through the standby multicast topology, which implements fast switching of the forwarding path and ensures normal operation of the service when the network is partially faulty. On the other hand, when the active multicast topology is normal, the multicast packet is forwarded through the active multicast topology only, which avoids excessive occupation of network resources and ensures performance of the multicast system.

The following uses a specific application scenario to describe the multicast packet transmission method provided in this embodiment.

Figure 2:
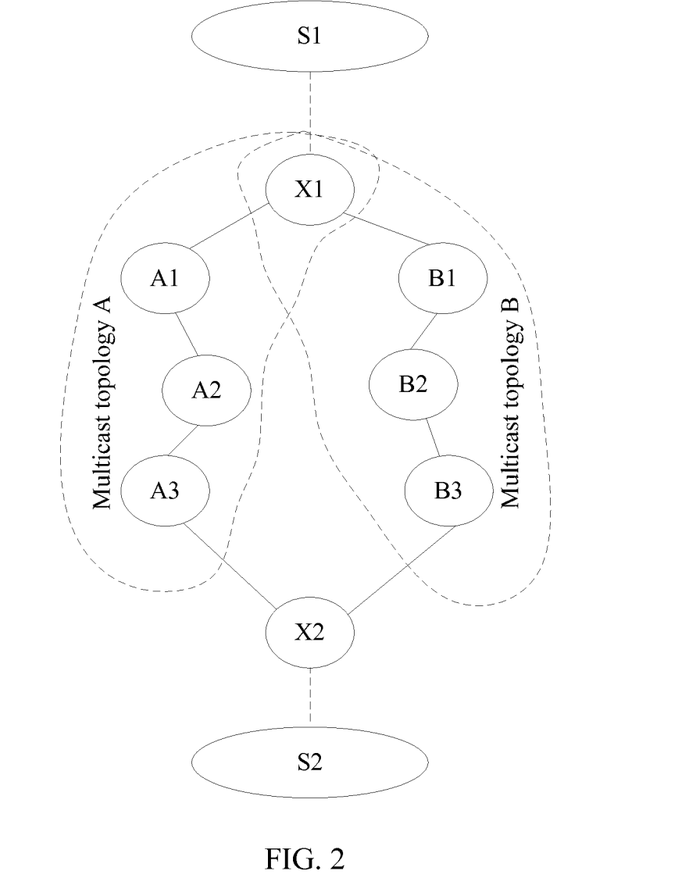
FIG. 2 is a schematic diagram of a network architecture in an application scenario according to an embodiment of the present invention.

FIG. 2 is a schematic diagram of a network architecture in an application scenario according to an embodiment of the present invention. The upstream aggregator X1 is responsible for forwarding the multicast packet delivered by the multicast source S1 to the multicast topology. In this embodiment, the upstream aggregator X1 may be a source DR or an RP; and the downstream aggregator X2 is responsible for forwarding the received multicast packet to the receiver S2. The multicast topology A and the multicast topology B may be constructed in the following procedure: Upon receiving a multicast data request from the receiver S2, the downstream aggregator X2 sends a PIM protocol packet to upstream neighboring nodes A3 and B3 in two different network segments respectively to create a forwarding path A3-X2 and a forwarding path B3-X2; the node A3 sends the PIM protocol packet to its upstream neighboring node A2 to create a forwarding path A2-A3-X2, the node A2 sends the PIM protocol packet to its upstream neighboring node A1 to create a forwarding path A1-A2-A3-X2, and the node A1 sends the PIM protocol packet to the upstream aggregator X1 to finish creating the multicast topology A. Likewise, the node B3 sends the PIM protocol packet to its upstream neighboring node B2, the node B2 sends the PIM protocol packet to its upstream neighboring node B1 to create a forwarding path B1-B2-B3-X2, and the node B1 sends the PIM protocol packet to the upstream aggregator X1 to create the multicast topology B.

In this embodiment, the downstream aggregator X2 sends the first PIM protocol packet to the node A3, and the downstream aggregator X2 sends the second PIM protocol packet to the node B3, where the second PIM protocol packet carries a standby multicast identifier to indicate that the multicast topology B to be created is a standby multicast topology. The upstream aggregator X1 resolves the PIM protocol packet from the node B1 to obtain the standby multicast identifier in the packet, and knows that the currently connected multicast topology B is a standby multicast topology. The upstream aggregator X1 sets the standby multicast topology to a disabled state, namely, forbids duplication of the multicast packet for the corresponding output interface of the node B1, and/or, forbids the corresponding output interface of the node B1 to forward the multicast packet; upon determining that the multicast topology A is faulty, the upstream aggregator X1 enables the standby multicast topology, namely, enables the duplication of the multicast packet for the corresponding output interface of the node B1, and/or, enables the corresponding output interface of the node B1 to forward the multicast packet.

In this embodiment, multiple multicast topologies are created based on the PIM protocol, and the standby multicast topology is identified by a standby multicast identifier carried in the second PIM protocol packet; the local output interface located in the standby multicast topology is disabled when the active multicast topology is normal so that the multicast packet is not forwarded through the standby multicast topology; when the active multicast topology is faulty, the local output interface located in the standby multicast topology is enabled so that the multicast packet is forwarded through the standby multicast topology. On one hand, the technical solution of the present invention uses multiple multicast topologies, and therefore, when the active multicast topology is faulty, the multicast packet can be forwarded through the standby multicast topology, which implements fast switching of the forwarding path and ensures normal operation of the service when the network is partially faulty. On the other hand, when the active multicast topology is normal, the multicast packet is forwarded through the active multicast topology only, which avoids excessive occupation of network resources and ensures performance of the multicast system.

Figure 3:
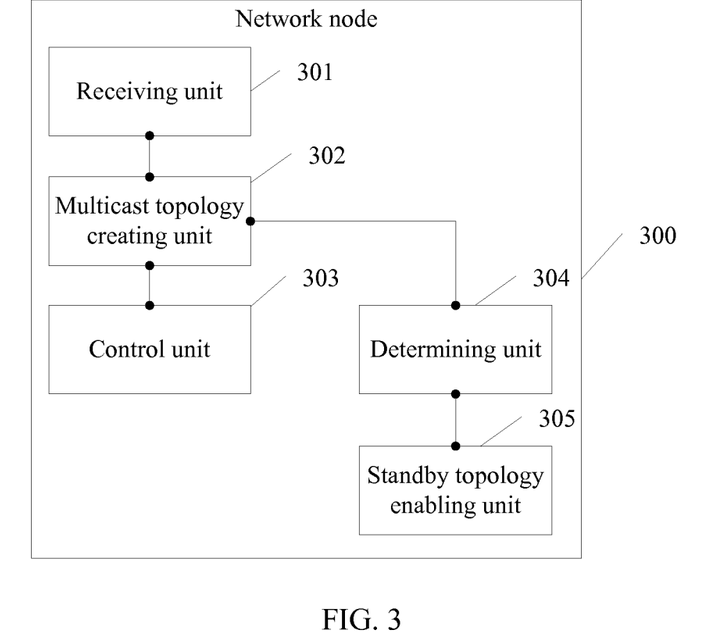
FIG. 3 is a schematic structural diagram of a network node according to an embodiment of the present invention.

The following describes a network node 300 in an embodiment of the present invention. As shown in FIG. 3, the network node includes: a receiving unit 301, a multicast topology creating unit 302, a control unit 303, a determining unit 304, and a standby topology enabling unit 305.

The receiving unit 301 is configured to receive a first PIM protocol packet and a second PIM protocol packet, where the second PIM protocol packet carries a standby multicast identifier.

The multicast topology creating unit 302 is configured to create an active multicast topology according to the first PIM protocol packet received by the receiving unit 301, and create a standby multicast topology according to the second PIM protocol packet received by the receiving unit 301.

The control unit 303 is configured to set the standby multicast topology to a disabled state.

In this embodiment, the control unit 303 includes a first control subunit and/or a second control subunit. The first control subunit is configured to forbid the network node 300 to duplicate a multicast packet for an output interface which is of the network node 300 and is located on the standby multicast topology; and the second control subunit is configured to forbid the output interface which is of the network node 300 and is located on the standby multicast topology to forward the multicast packet.

The determining unit 304 is configured to determine the active multicast topology as faulty.

The fault of the multicast topology means that the multicast topology is unable to forward the multicast packet normally. There are many causes for the multicast topology fault. For example, a node in the multicast topology is damaged, which leads to a link fault, or network congestion occurs in the network segment of the multicast topology, which leads to a communication fault.

In this embodiment, the network node 300 performs real-time detection for the active multicast topology, and, when the active multicast topology is detected as faulty, triggers the determining unit 304; or, another device such as a network management device performs real-time detection for the active multicast topology, and, when the active multicast topology is faulty, sends fault notification information indicating the active multicast topology fault to the network node 300, and then the determining unit 304 determines that the active multicast topology is faulty according to the received fault notification information indicating the active multicast topology fault; or, when a node of the active multicast topology is unable to forward the multicast packet to its downstream node normally, the node sends the fault notification information indicating the active multicast topology fault to the upstream aggregator, and the judging unit 303 determines that the active multicast topology is faulty according to the received fault notification information. The specific fault judging mode is not limited herein.

In this embodiment, the network node 300 further includes a switchback unit, which is configured to set the multicast topology to a disabled state after it is determined that the active multicast topology recovers from the fault. In this embodiment, the network node 300 may perform real-time detection for the faulty active multicast topology, and trigger the switchback unit when detecting that the active multicast topology recovers from the fault; or, another device such as a network management device performs real-time detection for the faulty active multicast topology, and, when the active multicast topology recovers from the fault, sends failover information indicating failover of the active multicast topology to the network node 300, whereupon the network node 300 triggers the switchback unit after receiving the failover information; or, after the faulty active multicast topology recovers from the fault, any one node in the active multicast topology sends failover information indicating failover of the active multicast topology to the network node 300, whereupon the network node 300 triggers the switchback unit after receiving the failover information. The specific mode is not limited herein.

The standby topology enabling unit 305 is configured to enable the standby multicast topology after the determining unit 304 determines the active multicast topology as faulty.

In this embodiment, the standby topology enabling unit 305 includes a first standby topology enabling subunit and/or a second standby topology enabling subunit. The first standby topology enabling subunit is configured to forbid the network node 300 to duplicate a multicast packet for an output interface which is of the network node 300 and is located on the standby multicast topology after the determining unit 304 determines that the active multicast topology is faulty; and the second standby topology enabling subunit is configured to forbid the output interface which is of the network node 300 and is located on the standby multicast topology to forward the multicast packet after the determining unit 304 determines that the active multicast topology is faulty.

In this embodiment, the network node 300 may be a root node of the source tree, such as DR; or may be a root node of an RPT, such as RP, and the specific form of the network node is not limited herein.

Understandably, the network node 300 in this embodiment may be the upstream aggregator in the foregoing method embodiment, and may be configured to implement all technical solutions in the foregoing method embodiments. The functions of the function modules of the network node may be implemented according to the foregoing method embodiments. For the detailed implementation process, see the relevant description in the foregoing embodiments, and is not repeated here any further.

In this embodiment, multiple multicast topologies are created based on the PIM protocol, and the network node 300 identifies the standby multicast topology according to a standby multicast identifier carried in the second PIM protocol packet; the network node 300 disables the local output interface located in the standby multicast topology when the active multicast topology is normal so that the multicast packet is not forwarded through the standby multicast topology; when the active multicast topology is faulty, the network node 300 enables the local output interface located in the standby multicast topology so that the multicast packet is forwarded through the standby multicast topology. On the one hand, the technical solution of the present invention uses multiple multicast topologies, and therefore, when the active multicast topology is faulty, the multicast packet can be forwarded through the standby multicast topology, which implements fast switching of the forwarding path and ensures normal operation of the service when the network is partially faulty. On the other hand, when the active multicast topology is normal, the multicast packet is forwarded through the active multicast topology only, which avoids excessive occupation of network resources and ensures performance of the multicast system.

An embodiment of the present invention provides a system of multiple multicast topologies. The system of multiple multicast topologies includes a network node, and the network node may be the network node 300 described in the apparatus embodiments above, and is not repeated here any further.

In this embodiment, the system of multiple multicast topologies creates multiple multicast topologies based on the PIM protocol, and the network node identifies the standby multicast topology according to a standby multicast identifier carried in the second PIM protocol packet; the network node disables the local output interface located in the standby multicast topology when the active multicast topology is normal so that the multicast packet is not forwarded through the standby multicast topology; when the active multicast topology is faulty, the network node enables the local output interface located in the standby multicast topology so that the multicast packet is forwarded through the standby multicast topology. On the one hand, the technical solution of the present invention uses multiple multicast topologies, and therefore, when the active multicast topology is faulty, the multicast packet can be forwarded through the standby multicast topology, which implements fast switching of the forwarding path and ensures normal operation of the service when the network is partially faulty. On the other hand, when the active multicast topology is normal, the multicast packet is forwarded through the active multicast topology only, which avoids excessive occupation of network resources and ensures performance of the multicast system.

Persons skilled in the art understand that, for brevity of description, the detailed working procedures of the system, apparatuses, and units described above are not repeated here any further because they can be deduced effortlessly from the corresponding procedures in the foregoing method embodiments.

Understandably, in the embodiments described herein, the disclosed system, apparatuses and methods may be implemented in other modes. For example, the apparatus embodiments above are illustrative in nature, and the units of the apparatus are defined from the perspective of logical functions only and may be defined in a different way in practical application. For example, multiple units or components may be combined or integrated into another system, or some features are omissible or not executed. Besides, the coupling, direct coupling or communication connection illustrated or discussed herein may be implemented through indirect coupling or communication connection between interfaces, apparatuses or units, and may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present invention, Besides, all functional units in the embodiments of the present invention may be physically stand-alone, or integrated into a processing module, or two or more of the units are integrated into one unit. The integrated unit may be hardware or a software function unit.

When being implemented as a software unit and sold or used as a stand-alone product, the integrated unit may be stored in a computer-readable storage medium. Therefore, the essence of the technical solution of the present invention, or its contribution to the prior art, or all or part of the technical solution, may be embodied in a software product. The software product may be stored in a computer-readable storage medium and incorporates several instructions for instructing a computer device (for example, personal computer, server, or network device) to execute all or part of the steps of the method specified in any embodiment of the present invention. Examples of the storage medium include various media capable of storing program codes, such as USB flash disk, mobile hard disk, read-only memory (ROM), random access memory (RAM), magnetic disk, or CD-ROM.

The text above gives details about a multicast packet transmission method, a related device and a system according to the embodiments of the present invention. Although the invention is described through some exemplary embodiments, the invention is not limited to such embodiments. It is apparent that persons skilled in the art can make modifications and variations to the invention without departing from the spirit and scope of the invention. The invention is intended to cover the modifications and variations provided that they fall in the scope of protection defined by the following claims or their equivalents.

What is claimed is:

1. A multicast packet transmission method, comprising:
   receiving, by an upstream aggregator, a first Protocol Independent Multicast (PIM) protocol packet;
   creating, by the upstream aggregator, an active multicast topology according to the first PIM protocol packet;
   receiving, by the upstream aggregator, a second PIM protocol packet from a downstream device of the upstream aggregator, wherein the second PIM protocol packet carries a standby multicast identifier indicating that a multicast topology based on the second PIM protocol packet is a standby multicast topology;
   creating, by the upstream aggregator, a standby multicast topology according to the second PIM protocol packet;
   setting, by the upstream aggregator, the standby multicast topology, indicated by the standby multicast identifier, to a disabled state;
   determining, by the upstream aggregator, the active multicast topology as faulty; and
   enabling, by the upstream aggregator, the standby multicast topology, indicated by the standby multicast identifier, after the active topology is determined as faulty.

2. The method according to claim 1, wherein:
   the enabling the standby multicast topology comprises at least one of:
   enabling the upstream aggregator to duplicate the multicast packet for the output interface which is of the upstream aggregator and is located on the standby multicast topology; and
   enabling the output interface which is of the upstream aggregator and is located on the standby multicast topology to forward the multicast packet.

3. The method according to claim 1, wherein determining the active multicast topology as faulty comprises:
   determining the active multicast topology as faulty according to received fault notification information indicating a fault of the active multicast topology.

4. The method according to claim 1, wherein after enabling the standby multicast topology, the method further comprises:
   setting the standby multicast topology, indicated by the standby multicast identifier, to the disabled state after it is determined that the active multicast topology recovers.

5. A network node, comprising a processor and a non-transitory computer readable storage medium, wherein the non-transitory computer readable storage medium comprising computer program instructions which when executed by the processor cause the processor to:
   receive a first Protocol Independent Multicast (PIM) protocol packet, and receive a second PIM protocol packet from a downstream device of the network node, wherein the second PIM protocol packet carries a standby multicast identifier indicating that a multicast topology based on the second PIM protocol packet is a standby multicast topology;
   create an active multicast topology according to the first PIM protocol packet received, and create a standby multicast topology according to the second PIM protocol packet;
   set the standby multicast topology, indicated by the standby multicast identifier, to a disabled state;
   determine the active multicast topology as faulty; and
   enable the standby multicast topology, indicated by the standby multicast identifier, after the active multicast topology is determined as faulty.

6. The network node according to claim 5, wherein the processor is further caused to:
   enable the network node to duplicate the multicast packet for the output interface which is of the network node and is located on the standby multicast topology after the active multicast topology is determined as faulty; and
   enable the output interface which is of the network node and is located on the standby multicast topology to forward the multicast packet after the active multicast topology is determined as faulty.

7. The network node according to claim 5, wherein the processor is further caused to:
   determine the active multicast topology as faulty according to received fault notification information indicating a fault of the active multicast topology.

8. The network node according to claim 5, wherein the processor is further caused to:
   set the standby multicast topology, indicated by the standby multicast identifier, to the disabled state after it is determined that the active multicast topology recovers.

9. A system of a multiple multicast topologies, comprising: a network node according to claim 5.

10. The method according to claim 1, wherein the setting the standby multicast topology, indicated by the standby multicast identifier, to the disabled state comprises at least one of:

forbidding the upstream aggregator to duplicate a multicast packet for an output interface which is of the upstream aggregator and is located on the standby multicast topology; and, forbidding the output interface which is of the upstream aggregator and is located on the standby multicast topology to forward the multicast packet.

11. The network node according to claim 5, wherein the processor is further caused to execute at least one of the following:

forbidding the network node to duplicate a multicast packet for an output interface which is of the network node and is located on the standby multicast topology; and forbidding the output interface which is of the network node and is located on the standby multicast topology to forward the multicast packet.

12. A non-transitory computer readable storage medium, comprising computer program instructions which, when executed by a processor, cause the processor to:

receive a first Protocol Independent Multicast (PIM) protocol packet;

create an active multicast topology according to the first PIM protocol packet received;

receive a second PIM protocol packet from a downstream device of a device comprising the processor, wherein the second PIM protocol packet carries a standby multicast identifier indicating that a multicast topology based on the second PIM protocol packet is a standby multicast topology;

create a standby multicast topology according to the second PIM protocol packet;

set the standby multicast topology indicated by the standby multicast identifier to a disabled state;

determine the active multicast topology as faulty; and enable the standby multicast topology, indicated by the standby multicast identifier, after the active multicast topology is determined as faulty.

* * * * *